United States Patent [19]

Johnston et al.

[11] Patent Number: 4,821,566
[45] Date of Patent: Apr. 18, 1989

[54] AIR DATA MEASUREMENT APPARATUS

[75] Inventors: James S. Johnston; David W. Pownall; Melvyn S. White, all of West Sussex, England

[73] Assignee: Rosemount Limited, United Kingdom

[21] Appl. No.: 168,866

[22] Filed: Mar. 16, 1988

[30] Foreign Application Priority Data

Mar. 25, 1987 [GB] United Kingdom ............... 8707093

[51] Int. Cl.$^4$ .................. G01C 21/00; G01L 7/00
[52] U.S. Cl. .................... 73/178 R; 73/714; 374/138; 374/143
[58] Field of Search ............ 73/178 R, 178 T, 178 H, 73/180, 182, 214, 700, 714; 374/143, 138, 135

[56] References Cited

U.S. PATENT DOCUMENTS

| 3,000,213 | 9/1961 | Eves et al. | 73/349 |
| 3,605,495 | 9/1971 | Krause et al. | 374/143 |
| 4,403,872 | 9/1983 | DeLeo | 374/138 |
| 4,549,706 | 10/1985 | Stickney | 244/1 R |
| 4,765,751 | 8/1988 | Pannone | 374/143 |

FOREIGN PATENT DOCUMENTS 526549 9/1940 United Kingdom .

OTHER PUBLICATIONS

Isiaf '85 Record, International Congress on Instrumentation in Aerospace Simulation Facilities, Aug. 26–28,1985, pp. 9–25, IEEE, New York, N.Y.; J.P. Archambaud et al., "Instrumentation and Testing Techniques in the T2 Transonic Cryogenic Wind Tunnel at the Onera/Cert", pp. 14–20.

Primary Examiner—Donald O. Woodiel
Attorney, Agent, or Firm—Kinney & Lange

[57] ABSTRACT

Air data measurement apparatus for use on an aircraft, comprises a housing (1) open at both ends (2, 3) and divided into two chambers (8, 9) by a transverse wall (7). The leading end chamber (8) contains a total pressure sensor (11) and the trailing end chamber (9) contains a total temperature sensor assembly (15) whereby the apparatus functions to measure total temperature and pressure at a common point on an aircraft.

10 Claims, 2 Drawing Sheets

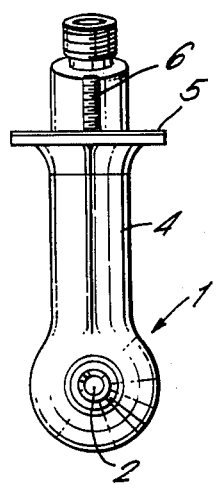
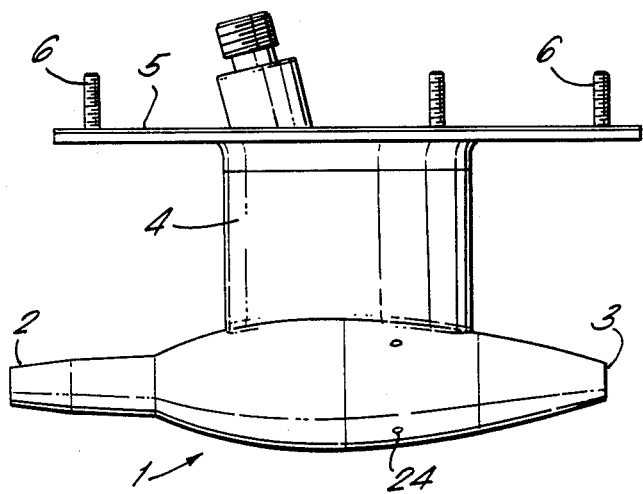
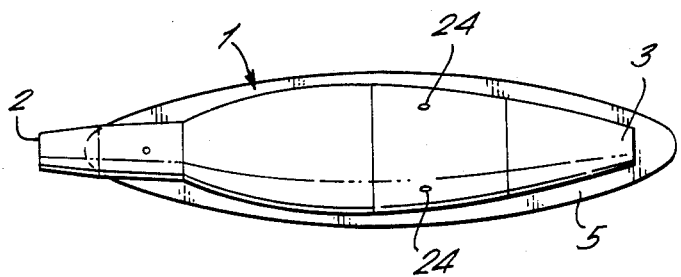

AIR DATA MEASUREMENT APPARATUS

This invention relates to air data measurement apparatus, and particularly to such apparatus for use on aircraft.

With jet engines in aircraft fuel flow to an engine is controlled in dependence upon the engine pressure ratio, that is the ratio of the total pressure at the leading end of the engine to the exhaust pressure. This ratio varies directly with engine thrust, and a pilot sets the required thrust which is converted to the equivalent engine pressure ratio which is then used to control the engine as necessary. In order to determine the required thrust the pilot needs to know the total air temperature at the engine inlet, and this is generally obtained from an airframe total temperature sensor elsewhere on the aircraft. By total air temperature is meant the maximum temperature attainable by the air when brought to rest, adiabatically, this being different from the static air temperature which is the temperature of the undisturbed air through which the aircraft is about to fly.

Thus, the pilot requires to know both the total pressure and the total air temperature at the inlet of an engine, and clearly for reasons of accuracy it is preferable for both measurements to be taken at the same location and for reasons of weight and cost it would be preferable for a single pressure and temperature measurement apparatus to be used.

According to this invention there is provided air data measurement apparatus comprising an elongate housing open at its opposite ends and adapted to be mounted on an aircraft with one end leading in the direction of flight of the aircraft; a transverse wall in the housing dividing the housing into leading and trailing end chambers; a number of suction vents in the wall of the housing providing communication between the trailing end chamber and the exterior of the housing; a total pressure sensor in the leading end chamber; and a total temperature sensing element assembly in the trailing end chamber.

This invention will now be described by way of example with reference to the drawings, in which:

FIG. 1 is a side elevational view of apparatus according to the invention;

FIG. 2 is an end view of the apparatus of FIG. 1;

FIG. 3 is a underneath plan view of the apparatus of FIG. 1; and

Figure 4:
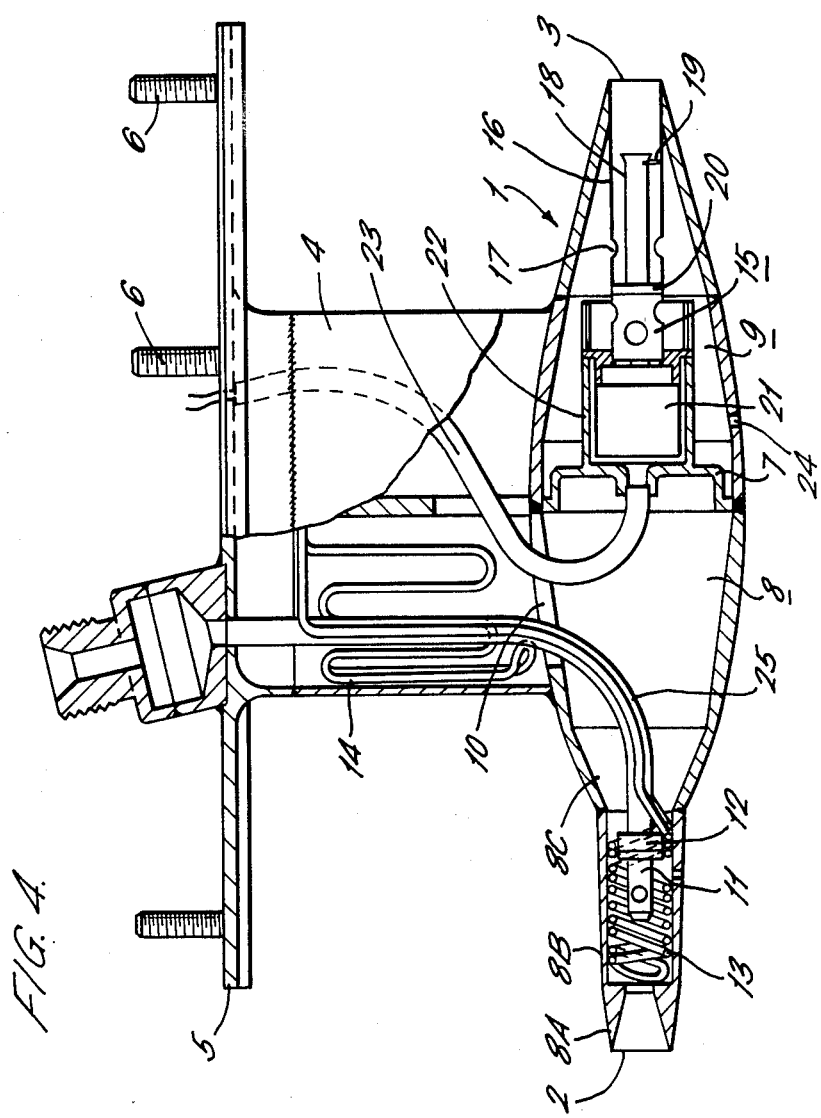
FIG. 4 is a sectional side view of the apparatus of FIGS. 1 to 3.

The apparatus to be described is an air data measurement apparatus for use on an aircraft to measure total pressure and total temperature.

The apparatus comprises an elongate circular cross-section housing 1 open at both ends 2 and 3.

The housing 1 is carried by a strut 4 extending from a mounting plate 5 having locating studs 6, and by which the apparatus can be mounted on an aircraft with the end 2 leading in the direction of light of the aircraft.

As clearly shown in the drawing, the housing 1 has a smooth outer profile and tapers from its middle towards both ends 2 and 3.

Referring now specifically to FIG. 4, the interior of the housing 1 is divided by a transverse wall 7 of low thermal loss material, into two chambers 8 and 9 open at the leading and trailing ends 2 and 3 of the housing 1, respectively.

The leading end chamber 8 comprises an inwardly tapering nozzle section 8A open at the end 2 of the housing 1, which leads to an intermediate section 8B in the form of a circular cylinder, which in turn leads to an outwardly tapering inner section 8C the wall of which is formed with an opening 10 communicating with the interior of the strut 4.

The chamber section 8B contains a total pressure sensor 11 of known form, which is supported by a sealing bulkhead 12. A pressure take off pipe 25 extends from the sensor 11 into the chamber section 8C, through the opening 10 and then through the strut 4 to a termination on the side of the plate 5 remote from the strut 4.

The chamber section 8B also contains a bifilar wound co-axial heating element 13 which also extends through the strut 14 for connection within the aircraft.

The leading edge portion of the strut 4 contains a co-axial heating element 14 of known form.

The trailing end chamber 9 of the housing 1 contains a total temperature sensing assembly 15 of concentric hollow tube type, and including a guide tube 16 extending from the open trailing end 3 of the housing 1 and having a number of air bleed holes 17 in its wall through which air entering the guide tube 16 passes into the chamber 9, and a platinum resistance sensor tube 18 mounted in the guide tube 16 by means of support pins 19 adjacent the free end of the sensor tube 18 and an orifice plate 20 extending between the tubes adjacent the inner end of the sensor tube 18. The use of the guide tube 16 ensures that all of the air entering the open trailing end 3 of the housing 1 is directed over the sensor tube 18, this improving the response time and recovery factor of the temperature sensing arrangement. The sensor tube 18 is connected through connection box 21 which is mounted in an annular wall 22 extending from the transverse wall 7. The sensor tube 18 provides an electrical signal representative of the total temperature measured, which signal is passed by way of a cable 23 extending from the box 21 through the chamber section 8C, the opening 10 and the strut 4, to the interior of the aircraft.

The wall of the housing 1 about the chamber 9 is formed with a ring of four suction vents 24 (see FIGS. 2 and 3) by which air entering the chamber 9 through the open end 3 leaves again. The vents 24 are located at 50° (±2.5°) and 125° (±2.5°) around the body 1 on both sides of the central longitudinal plane thereof from its lowest point as seen in FIG. 4.

For use, the apparatus described above is mounted on an aircraft by means of the plate 5, with the leading end 2 of the housing 1 pointing in the direction of flight of the aircraft. When the aircraft is flying air enters the leading end 2 of the housing 1 and the sensor 11 functions to pass the total pressure obtaining in the chamber section 8B over the pipe 25 to calculating apparatus within the aircraft. Further, air flows over the surface of the body generating a low pressure in the area of vents 24, thus causing air flow into the guide tube 16 and the sensor tube 18, the air passing through the bleed holes 17 into the chamber 9 and then out through the vents 24. The temperature measurement signal produced by the sensor tube 18 is passed over the cable 23 to the calculating apparatus in the aircraft.

The apparatus thus functions to measure the total pressure and total temperature at a common position on the aircraft, the measurements being supplied to calculating apparatus in the aircraft to effect control of the aircraft as necessary.

As is well known, a difficulty which can arise with pressure sensors as described above is build-up of ice, this being the reason for the inclusion of the heating element 13 in the chamber section 8B of the housing 1. With apparatus as described above the difficulty can arise that although the heating element 13 prevents build up of ice at the leading end of the housing 1, this can result in ice formation at the suction vents 24, thus preventing operation of the temperature sensing element as required. To avoid this provision can be made to ensure that any ice formation takes place between the leading end of the housing 1 and the vents 24, that is on the wall of the chamber section 8C of the housing 1. This can be achieved by making the wall of the chamber section 8C of a relatively low thermal conductivity material as compared with the material used for the wall of the chamber sections 8A and 8B.

Although in the apparatus described above the temperature sensing element 18 is in the form of a sensor tube having a platinum resistance element in the wall, it will be appreciated that any other type of suitable sensing element can be used, with or without a guide tube (16) as described.

We claim:

1. Air data measurement apparatus comprising an elongated housing open at its opposite ends and adapted to be mounted on an aircraft with one end leading in the direction of flight of the aircraft; a transverse wall in the housing dividing the housing into leading and trailing end chambers; a number of suction vents in the wall of the housing providing communication between the trailing end chamber and the exterior of the housing; a total pressure sensor in the leading end chamber; and a total temperature sensing element assembly in the trailing end chamber.

2. Apparatus as claimed in claim 1, in which the temperature sensing element assembly includes a guide tube extending from the open trailing end of the housing and having a number of bleed holes in its wall through which air entering the guide tube passes into the trailing end chamber, and a temperature sensor element mounted in the guide tube.

3. Apparatus as claimed in claim 2, in which an orifice plate is mounted adjacent the inner end of the guide tube, air entering the guide tube passing through orifices in the orifice plate and into the trailing end chamber through holes in the guide tube.

4. Apparatus as claimed in claim 3, in which the temperature sensor element is a tube mounted in the guide tube by means of support pins extending between the tubes at or adjacent the free end of the sensor tube, and the orifice plate.

5. Apparatus as claimed in claim 1, in which there is a ring of four suction vents, a suction vent being located at 50° (±2.5°) and 125° (±2.5°) around the body on both sides of its central longitudinal plane from a point on the body furthest from the aircraft in use of the apparatus.

6. Apparatus as claimed in claim 1, in which ice formation is prevented at the leading end of the housing but can take place between the leading end and the suction vents.

7. Apparatus as claimed in claim 1, in which the leading end chamber of the housing comprises an inwardly tapering nozzle section open to the leading end of the housing, which leads to an intermediate section containing the pressure sensing element, which in turn leads to an outwardly tapering inner section.

8. Apparatus as claimed in claim 7, in which the pressure sensing element is mounted in the intermediate section of the leading end chamber by means of a sealing bulkhead.

9. Apparatus as claimed in claim 7, in which the wall of the inner section of the leading end chamber is made of a material of relatively low thermal conductivity as compared with the material used for the wall of the nozzle and intermediate sections of the leading end chamber.

10. Apparatus as claimed in claim 1, in which the housing is carried by a strut which carries at its end remote from the housing a mounting plate by which the apparatus can be mounted on an aircraft.

* * * * *